Figure 1:
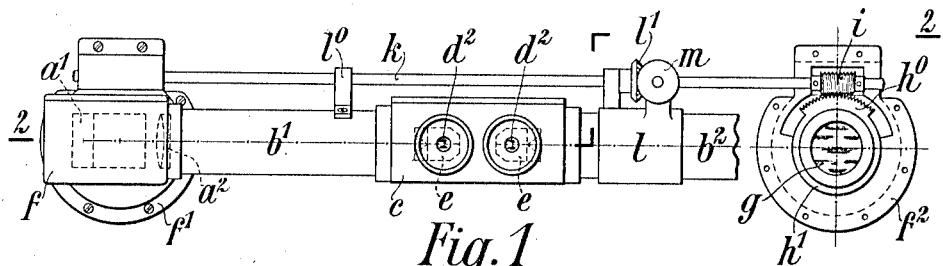

O. EPPENSTEIN.
HORIZONTAL TELEMETER.
APPLICATION FILED JULY 17, 1913.

1,118,337.

Patented Nov. 24, 1914.

Witnesses:

Inventor:
Otto Eppenstein

UNITED STATES PATENT OFFICE.

OTTO EPPENSTEIN, OF JENA, GERMANY, ASSIGNOR TO THE FIRM OF CARL ZEISS, OF JENA, GERMANY.

HORIZONTAL TELEMETER.

1,118,337. Specification of Letters Patent. Patented Nov. 24, 1914.

Application filed July 17, 1913. Serial No. 779,488.

*To all whom it may concern:*

Be it known that I, OTTO EPPENSTEIN, a citizen of the German Empire, residing at Jena, Germany, have invented a new and useful Horizontal Telemeter, of which the following is a specification.

The present invention relates to horizontal telemeters, in which the base-line used as the basis of measurement belongs to the instrument. According to the invention such a telemeter is provided with two deflecting devices, each of which is pierced by one of the two pencil systems belonging to the ends of the base-line and allows of the image formed from the corresponding pencil system being displaced parallel to the base-line, both deflecting devices being coupled with one another in such a manner that the two images presented to the observer can be displaced parallel to the base-line jointly by a small amount. Such a joint displacement of the two images by a small amount corresponds to a small rotation of the whole instrument in the plane of triangulation through a small angle and may serve as an equivalent for such a rotation, *e. g.* in order to bring about in an instrument, which is disposed immovably relatively to a shield provided with look-out holes and behind the said shield, a small alteration in the direction of out-look relatively to the shield. The alteration belonging to a small joint displacement of the two images of the distance apart of the two axial rays entering the instrument (which signifies an alteration of the base-line used as the basis of measurement) is so small that it is of no importance as compared with the unavoidable errors of observation.

When a telemeter, in which in order to carry out the measurement a relative displacement of the two images parallel to the base-line is required (*e. g.* a coincidence telemeter), is equipped according to the invention, such a relative displacement of the images can be carried out by means of the deflecting devices serving for the joint displacement, if these be so coupled with one another that a relative shifting of the two devices can be effected. Such an actuation of the two deflecting devices in opposite directions may also be employed for displacing the two images relatively to one another for purposes of adjustment parallel to the base-line.

As deflecting device there may, *e. g.*, be used one of the well-known devices, which are employed in telemeters for displacing an image in the direction parallel to the base-line for measuring or adjusting purposes. When simultaneously with the displacement in the direction parallel to the base-line a displacement in a direction perpendicular to the same is effected, two such devices may be so placed one behind the other in a well-known manner that the two displacements, which are directed perpendicularly to the base-line, compensate each other. When it is for instance desired to effect the displacement of the image in the direction parallel to the base-line by means of a refracting prism, which is placed in front of the corresponding objective lens and is rotatable about the optical axis of the latter, the displacement of the image in the direction perpendicular to the base-line, effected on the said prism being rotated, may be compensated by a second such prism, which is rotated during the rotation of the former prism by the same amount but in the opposite direction. Such an application of two pairs of prisms instead of two prisms is especially to be recommended, when the deflecting devices are to lie behind the objective prisms of the instrument, so that the two axial rays in this case as well pass through the objective prisms in a direction parallel to the plane of triangulation; the two single prisms, that are to be rotated in the same direction, may be rigidly connected with one another. If it be desired to avoid the dispersion entailed in the employment of a refracting prism, such a prism may be replaced by a pair of reflectors, which have a common principal plane of reflection and are inclined to one another by a small angle.

Figure 2:
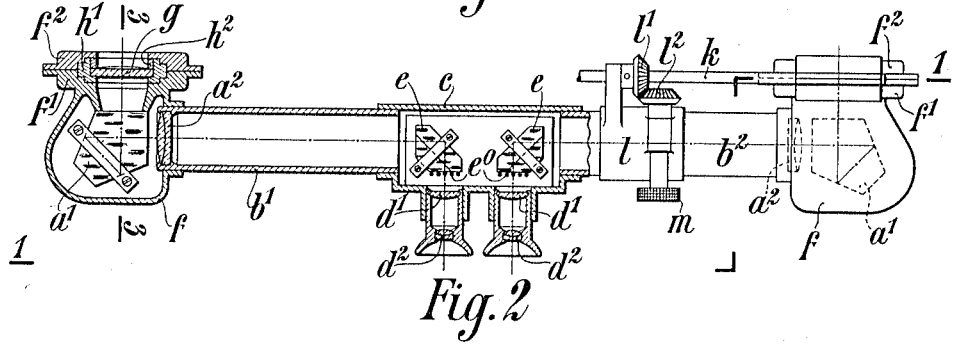
Figure 3:
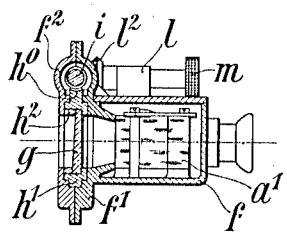
Figure 4:
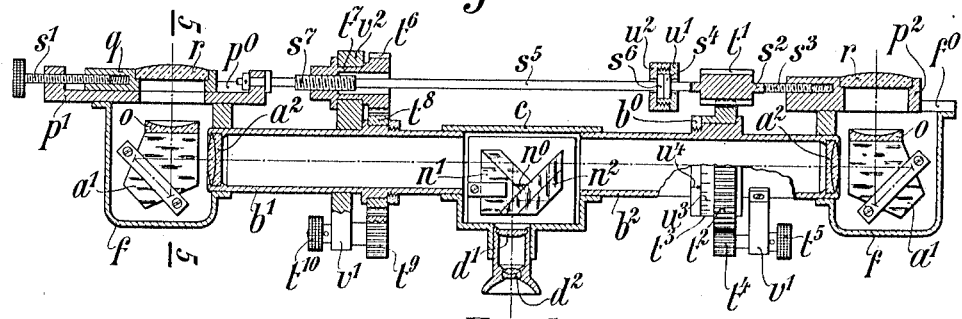
Figure 5:
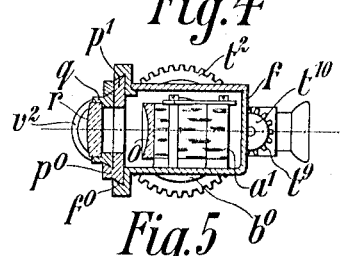

In the annexed drawing: Figure 1 is an elevation, partly in section, of a constructional example of a stereoscopic telemeter according to the invention. Fig. 2 is a section on line 2—2 of Fig. 1. Fig. 3 is a section on line 3—3 of Fig. 2. Fig. 4 is a horizontal section through an example of a coincidence telemeter according to the invention, presenting two erect images to the observer. Fig. 5 is a section on line 5—5 of Fig. 4.

In the first example, Figs. 1 to 3, the objective systems each consist of a pentagonal prism $a^1$ and an objective lens $a^2$. The two tubes $b^1$ and $b^2$, which each carry one of the objective lenses, are connected together by an intermediate body $c$, which receives the ocular system. In front of each of the two oculars $d^1$, $d^2$ a ridge prism $e$ is disposed, the surface of emergence of which lies in the focal plane of the corresponding ocular and carries a system of marks $e^0$. In each of the two objective prism casings $f$ there is journaled in a projecting part $f^1$ behind a lid $f^2$ a glass wedge $g$ with its mounting $h^1$, $h^2$ rotatably about the corresponding axis of entrance in such a manner that the plane of its principal section is parallel to the axis of entrance of the corresponding objective prism. The mountings are provided with two worm-wheel segments $h^0$ geared the same way, with each of which a worm $i$ journaled in the corresponding objective prism casing engages. A shaft $k$ serves for the joint rotation of the two glass wedges, which shaft is connected with both worms, is journaled on the instrument in a body $l$ and in a second body $l^0$ and may be rotated by means of bevel gearing $l^1$, $l^2$ with the aid of a milled head $m$.

In the coincidence telemeter, Figs. 4 and 5, the objective systems again each consist of a pentagonal prism $a^1$ and an objective lens $a^2$. An intermediate body $c$ connects the two tubes $b^1$ and $b^2$ carrying the objective lenses with one another and contains the ocular $d^1$, $d^2$ and also the separating prism system $n^1$, $n^2$. The cement layer $n^0$ between the two prisms $n^1$ and $n^2$, each of which is provided with a ridge, is formed in its upper half as a separating layer reflecting on both sides. Onto the surface of entrance of each of the two objective prisms $a^1$ a dispersive lens $o$ is cemented. Each of the two objective prism casings $f$ is provided with a pair of guide-bars $f^0$ parallel to the base-line and serving as a guide on the left-hand side for a slide $p^1$ and on the right-hand side for a slide $p^2$. The left-hand slide again carries a pair of guide-bars $p^0$ parallel to the base-line and destined for a slide $q$. A collective lens $r$, the dimension parallel to the base-line of which is greater than the lens $o$, is fixed in the slide $q$, so as to be displaceable by means of an actuating screw $s^1$ in the direction parallel to the base-line. On the right-hand side of the instrument a similar lens $r$ is fixed in the slide $p^2$, with which a bolt $s^2$ engages by means of a screwed part $s^3$. The middle part of the bolt $s^2$ is formed as a toothed drum $t^1$ and its left-hand end carries a flange $s^4$. A rod $s^5$ is fitted at its right-hand end with a flange $s^6$, which together with the flange $s^4$ is inclosed by a coupling $u^1$, $u^2$ in such a manner that the bolt $s^2$ and the rod $s^5$ are rotatable relatively to one another, but are prevented from being displaced relatively to one another in the axial direction. The tube $b^2$ is surrounded by a toothed wheel $t^2$, which is rotatably journaled on the said tube and engages with the toothed drum $t^1$.

A ring $t^3$ at the side of the toothed wheel $t^2$ is provided with a distance scale $u^3$, to which there belongs an index $u^4$ on a ring $b^0$, which latter is screwed onto the tube $b^2$. For rotating the toothed wheel $t^2$ a toothed wheel $t^4$ is provided, which is carried by a journal $v^1$ and the shaft of which is fitted with a milled head $t^5$. The rod $s^5$ is provided with a screw-thread $s^7$ and is attached at its left-hand end to the slide $p^1$ in such a manner as to be rotatable but non-slidable in the axial direction. A toothed wheel $t^6$ is carried along with a socket $t^7$ by a journal $v^2$ and engages by means of a female thread on this socket with the screwed part $s^7$ of the rod $s^5$. The tube $b^1$ is surrounded by a toothed wheel $t^8$, which is journaled on the said tube and engages with the toothed wheel $t^6$. A journal $v^1$ carries a toothed wheel $t^9$, which engages with the toothed wheel $t^8$ and the shaft of which is fitted with a milled head $t^{10}$. By a rotation of the milled head $t^{10}$ in one direction or the other the two lenses $r$ are jointly displaced in one or the other direction parallel to the base-line, whereby, as is well known, each of the two lenses effects a displacement of the corresponding image in a direction parallel to the base-line. The milled head $t^5$ serves for the making of measurements. By the actuation of this milled head a displacement of the right-hand lens $r$ alone is effected, so that only the image belonging to the right-hand end of the base-line is displaced. For the adjustment of the distance-indication the left-hand lens $r$ may be displaced by itself with the aid of the actuating screw $s^1$, whereby a displacement by itself of the image belonging to the left-hand end of the base-line is effected.

I claim:

1. In a horizontal telemeter a base-line within the instrument, a measuring device, an ocular system, an ocular reflecting system, at either end of the said base-line an objective reflecting system, at either side of the said ocular reflecting system an objective lens system and a deflecting device, the said deflecting devices being adapted to displace the images formed from the ray pencil systems entering the instrument at either end of the base-line by a small amount in the direction of the said base-line and coupling means between the said deflecting devices, adapted to permit of a joint displacement in the same direction of the two images.

2. In a horizontal telemeter a base-line within the instrument, a measuring device, an ocular system, an ocular reflecting system, at either end of the said base-line an objective reflecting system, at either side of the said ocular reflecting system an objective lens system, in front of either objective lens system a refractive prism system having a small angle of refraction, each of which prism systems is rotatable about an axis lying in the plane of triangulation and perpendicular to the base-line, and coupling means between the said prism systems, adapted to permit of a joint rotation of the said prism systems.

OTTO EPPENSTEIN.

Witnesses:
PAUL KRÜGER,
RICHARD HAHN.